3,352,847
PROCESS FOR THE MANUFACTURE OF
4-AMINO-3-NITROAZOBENZENES
Hans Wilhelm Liechti, Oberwil, Basel-Land, Switzerland, assignor to Ciba Limited, Basel, Switzerland, a Swiss company
No Drawing. Filed Sept. 1, 1964, Ser. No. 393,761
Claims priority, application Switzerland, Sept. 11, 1963, 11,221/63
6 Claims. (Cl. 260—208)

By the hitherto known method 4-amino-3-nitro-1:1'-azobenzenes could be obtained only in a cumbersome way and in poor yield, namely by condensing a 1-amino-3-nitro-4-halobenzene with a nitrosobenzene to form 4-chloro-3-nitroazobenzene and exchange of the chlorine atom of the latter for an amino group, as represented by the following scheme:

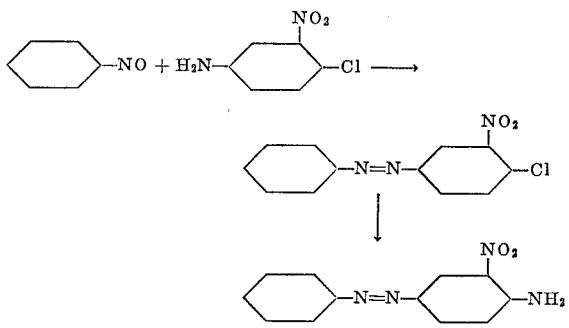

(cf. Borsche et al., Berichte 56, page 2353 [1923]).

The present invention is based on the observation that 4-amino-3-nitro-1:1'-azobenzenes can be obtained much more simply and in excellent yield when an azobenzene compound of the formula (1)

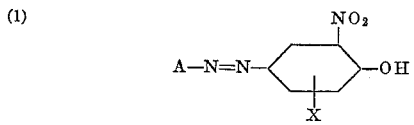

wherein A represents an aryl radical, for example a naphthalene radical, or preferably a substituted benzene radical, and X a hydrogen atom, an alkyl or alkoxy group, is heated with ammonia or an ammonia donor.

The aryl radical A may be substituted, for example by halogen atoms, nitro, alkyl, alkoxy or trifluoromethyl groups.

The azobenzene compounds of the Formula 1 are obtained when a diazotised amine, especially an aminobenzene, is coupled with the corresponding ortho-nitrophenol; or when a monoazo dye of the formula

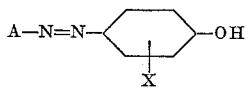

is nitrated.

As diazo components the following aminobenzenes may be mentioned:

Aniline,
2-, 3- or 4-chloraniline,
3-bromaniline,
4-methylaniline,
2-, 3- or 4-methoxyaniline,
4-nitraniline,
2:5-dichloroaniline,
3-trifluoromethylaniline,
3:5-bis-trifluoromethylaniline,
1-amino-2-methyl-4-chlorobenzene,
1-amino-2-methyl-3-chlorobenzene,
1-amino-2-methyl-5-chlorobenzene,
1-amino-2:5-dimethoxy-4-chlorobenzene,
1-amino-2-methoxy-4-chlorobenzene,
1-amino-2-methoxy-5-chlorobenzene,
1-amino-2-methoxy-4-nitrobenzene,
1-amino-2-methoxy-5-nitrobenzene,
1-amino-2-methyl-5-nitrobenzene,
1-amino-2-methyl-4-nitrobenzene,
1-amino-2-nitro-4-chlorobenzene,
1-amino-2-trifluoromethyl-4-chlorobenzene,
1-amino-3-trifluoromethyl-2-chlorobenzene,
4-amino-1:1'-diphenyl,
1-aminonaphtholene, and
2-aminonaphthalene.

The exchange of the hydroxyl group in the azobenzene compounds of Formula 1 for the amino group is advantageously carried out in a solvent, preferably one in which both the hydroxyazobenzene and ammonia are soluble, more especially in a lower aliphatic alcohol, for example methanol, ethanol or isopropanol. The alcohols may be used in a pure form or diluted with water. Dioxane and aqueous solutions thereof are likewise suitable. The reaction temperature is advantageously within the range from 130° to 200° C., preferably from 160° to 180° C. Under these conditions the reaction is usually finished in a few hours.

The reaction products are simple to work up. After the bulk of the solvent has been distilled off, the 4-amino-3-nitro-azobenzene compounds are obtained in good yield and purity. They are valuable dyestuffs and intermediates for the manufacture of dyestuffs.

The results of the present process could not have been expected since experience has shown that the azo group is sensitive to temperature, pressure and basic reagents.

Unless otherwise indicated, parts and percentages in the following examples are by weight.

*Example 1*

24.3 parts of 4-hydroxy-3-nitro-1:1'-azobenzene were heated in a solution of 30 parts of gaseous ammonia in 400 parts of ethanol in a closed vessel for 15 hours at 165° to 170° C. On completion of the reaction the batch was concentrated to one third its volume, and the precipitate formed was filtered and washed with cold ethanol. A sample of the resulting 4-amino-3-nitro-1:1'-azobenzene when recrystallised from alcohol melted at 173° C. The analysis agreed with the calculated values for this compound. The yield amounted to 81%.

The exchange reaction took place just as well when dioxane or aqueous dioxane was used instead of ethanol as solvent.

Naphthalene - 1:1' - azo-(4' - amino-3'-nitrobenzene) could be manufactured in a similar manner.

*Example 2*

27.75 parts of 4-hydroxy-3-nitro-3'-chloro-1:1'-azobenzene were stirred and heated in a solution of 30 parts of ammonia in 400 parts of ethanol in a closed vessel for 16 hours at 165° to 170° C. The batch was then concentrated to one third its volume and the resulting precipitate filtered and washed with cold ethanol. A sample of the product, recrystallised from ethanol, melted at 184° to 186° C. This melting point and the analytical data agreed with those for 4-amino-3-nitro-3'-chloro-1:1'-azobenzene. The yield amounted to 84%.

By the same method the following compounds could be manufactured:

4-amino-3-nitro-4'-chloro-1:1'-azobenzene,
4-amino-3-nitro-2'-chloro-1:1'-azobenzene,
4-amino-3-nitro-2':4'-dichloro-1:1'-azobenzene, and
4-amino-3-nitro-3'-trifluoromethyl-1:1'-azobenzene.

Example 3

22.8 parts of 4-hydroxy-4'-methoxy-1:1'-azobenzene were vigorously stirred portionwise at 35° to 40° C. into 200 parts of 40% nitric acid and the batch was further stirred at 35° to 40° C. to complete the nitration. The reaction mixture was then diluted with 1,500 parts of water and the reaction product isolated.

It was heated in an autoclave in 400 parts of dioxane and 30 parts of ammonia for 17 hours at 165° to 170° C., concentrated to one third its volume, the product filtered off and washed with cold ethanol. It melted at 168° to 170° C. whereas the starting material melted at 140° to 142° C.

This method was also suitable for the manufacture of 4-amino-3-nitro-2'-methoxy-1:1'-azobenzene.

What is claimed is:

1. A process for the manufacture of a 4-amino-3-nitro-azobenzene which consists of heating a 4-hydroxy-3-nitro-azobenzene of the formula

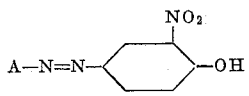

wherein A represents a benzene or naphthalene radical with ammonia.

2. A process as claimed in claim 1, wherein A in the given formula is a benzene radical.

3. A process as claimed in claim 2, wherein the reaction is carried out in an organic solvent selected from the group consisting of a lower alkanol and dioxane.

4. A process as claimed in claim 3, wherein the reaction is carried out in a lower alkanol as solvent.

5. A process as claimed in claim 4, wherein an aqueous lower alkanol is used as solvent.

6. A process as claimed in claim 1, wherein the reaction is performed at a temperature ranging from 130° to 200° C.

References Cited

UNITED STATES PATENTS

| | | | |
|---|---|---|---|
| 2,128,700 | 8/1938 | Frye et al. | 260—581 |
| 2,731,460 | 1/1956 | Schenck et al. | 260—581 X |
| 2,970,171 | 1/1961 | Cryer et al. | 260—581 |

FOREIGN PATENTS 497,947  11/1953  Canada.

CHARLES B. PARKER, *Primary Examiner.*

F. D. HIGEL, *Assistant Examiner.*